United States Patent
Lim et al.

(10) Patent No.: US 6,463,174 B1
(45) Date of Patent: Oct. 8, 2002

(54) MACROBLOCK-BASED SEGMENTATION AND BACKGROUND MOSAICKING METHOD

(75) Inventors: Young Kwon Lim; Sang Gyu Park; Chie Teuk Ahn, all of Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 0 days.

(21) Appl. No.: 09/404,716

(22) Filed: Sep. 24, 1999

(30) Foreign Application Priority Data

Nov. 17, 1998 (KR) ............................................. 98-49316

(51) Int. Cl.[7] .................................................. G06K 9/34
(52) U.S. Cl. ...................................... 382/173; 382/243
(58) Field of Search ................................. 382/232, 236, 382/239, 243, 173, 382, 283; 375/240.02, 240.08, 240.24; 348/420.1

(56) References Cited

U.S. PATENT DOCUMENTS

| | | | |
|---|---|---|---|
| 5,034,986 A | | 7/1991 | Karmann et al. ............ 382/103 |
| 5,631,975 A | | 5/1997 | Riglet et al. ................. 382/173 |
| 5,896,176 A | * | 4/1999 | Das et al. ................. 375/240.15 |
| 6,208,693 B1 | * | 3/2001 | Chen et al. ............. 375/240.24 |

OTHER PUBLICATIONS

Background Mosaicking for Low Bit Rate Video Coding, by Frédéric Dufaux et al, ICIP New York, Sep. 16–18, 1996, vol. 3, pp. 673–676, 0–7803–3258–X/96 © 1996 IEEE.

"Foreground/Background Video Coding Scheme", by Douglas Chai et al, appearing in 1997 IEEE International Symposium on Circuits and Systems, Jun. 9–12, Hong Kong, pp. 1448–1451, 0–7803–3583–X/97 ©1997 IEEE.

"Hierarchical Morphological Segmentation for Image Sequence Coding", by Philippe Salembier et al, appearing in IEEE Transactions on Image Proceeding, vol. 3, No. 5, Sep. 1994, pp. 639–651, 1057–7149/94, © 1994 IEEE.

* cited by examiner

Primary Examiner—Timothy M. Johnson
(74) Attorney, Agent, or Firm—Antonelli, Terry, Stout & Kraus, LLP

(57) ABSTRACT

There is disclosed a macroblock-based segmentation and background mosaicking method for object-based coding of image sequence having a stationary background. An image comprising a background having rare change and an object having slow change taken from a position and focus fixed camera is segmented into changing regions and stationary regions in units of macroblock of 16×16 pixels that is most widely used as a basic coding unit in a video coding method or apparatus. A background mosaic is constructed with only macroblocks corresponding to the regions having rare temporal change. The background mosaic is newly constructed with respect to an entire image whenever there are any changes in the image sequence, thereby maximizing coding efficiency. Therefore, the present inventions realizes a very low complexity, thus facilitating real time operation and maximizing efficiency in is object shape coding.

6 Claims, 2 Drawing Sheets

MACROBLOCK-BASED SEGMENTATION AND BACKGROUND MOSAICKING METHOD

BACKGROUND OF THE INVENTION

1. Field of the Invention

The present invention relates to a macroblock-based segmentation and background mosaicking method for object-oriented coding of image sequence having a stationary background and more particularly to a segmentation method for segmenting an image sequence into moving and changing object regions and stationary background regions having rare change and constructing a background mosaic consisting of only macroblocks corresponding to a region which rarely has temporal change with respect to the background regions in an image so as to minimize a size of a region to be coded, thereby maximizing coding efficiency. The present invention also adopts a macroblock of 16×16 pixels as the unit of image segmentation, thereby maximizing object shape coding efficiency with very low complexity.

2. Description of Related Art

Typically, a videophone system using moving pictures employs a communication channel of extremely limited bandwidth, so compressing images before transmission is essential for the purpose of reducing the volume of information to be transmitted.

One of the representative video coding methods is an object-based coding method segmenting an image into background regions and object regions before compression.

Specifically, according to this method, the image is segmented into the stationary background regions and the moving and changing object regions. Each segmented region is coded by usual block-based video coding techniques, such as discrete cosine transform and quantization.

Furthermore, shape information of each segmented region is separately coded and transmitted for reconstruction of the image during decoding.

Efficient encoding of object shape is very important to maximize compression efficiency in the object-based video coding method. According to conventional segmentation techniques, an image is segmented into regions based upon pixels using temporal or spatial change information of the image.

In other words, to segment the image into several regions, a change of brightness is calculated for each pixel and the corresponding pixel is determined as the background region or the object region according to the results of evaluation. This is very complicated.

As illustrated, since complicated processes are carried out to segment an image based upon pixels in the conventional segmentation methods, it is very difficult to have real-time implementation Moreover, large amount of bits are required to encode the shape information of regions segmented based upon pixels for transmission. This limits maximization of coding efficiency. Even if an overall coding rate decreases, a coding rate of the shape information cannot be lowered below a certain level. Therefore, the object-based coding method is not advantageous in case of very low bit rate communication.

In addition, the background region is always determined according to a difference between a current image and a preceding image. This disturbs realization of an advantage of the object-based coding method for enhancing the coding efficiency by segmenting stationary background regions against moving object regions.

SUMMARY OF THE INVENTION

Accordingly, the present invention is directed to a macroblock-based segmentation and background mosaicking method that substantially obviates one or more of the limitations and disadvantages of the related art.

An objective of the present invention is to provide a segmentation method for segmenting an image into moving and changing object regions and rarely changing stationary background regions and constructing a background mosaic with respect to the background regions so as to minimize a size of an area to be coded, thereby maximizing coding efficiency.

Another objective of the present invention is to provide a segmentation method of adopting a macroblock of 16×16 pixels as the unit of image segmentation, thereby maximizing object shape coding efficiency with very low complexity.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a macroblock-based segmentation and background mosaicking method comprises the steps of: receiving consecutive two frames; calculating validation statistics from the received frames to detect change/changelessness of respective macroblocks in a current frame; determining change/changelessness of respective macroblocks using the calculated validation statistics and generating a change detection mask; and judging respective macroblocks as background regions or object regions, using the change detection mask of the current frame, a change detection mask of a preceding frame, the current frame, and a background mosaic.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the accompanying drawings, an embodiment of the present invention will now be described in detail.

Figure 1:
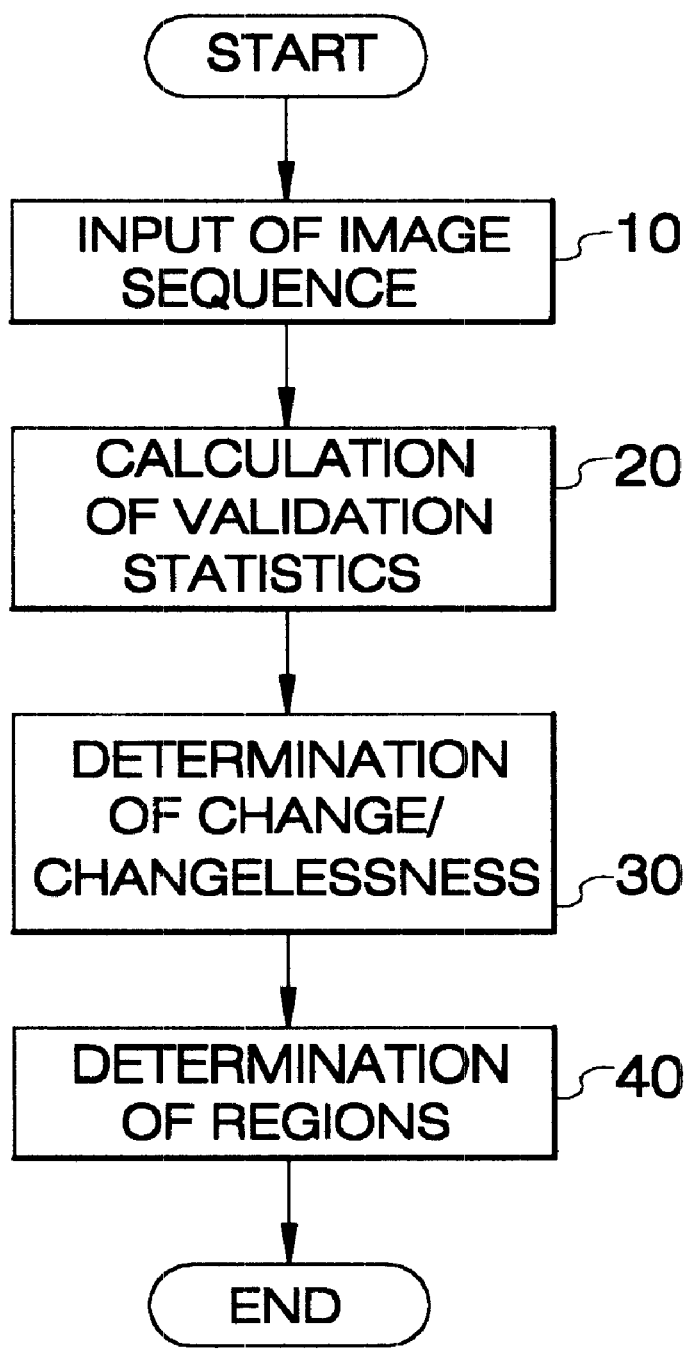
FIG. 1 is a flow chart showing operations of the present invention.

FIG. 1 is a flow chart of a segmentation and background mosaicking method according to the present invention.

Primarily, current and previous images are received (10). The previous image may be selected from an original image and a reconstructed image that has passed through coding and decoding.

Once the two images are received, validation statistics of respective macroblocks are calculated from the two images. The validation statistic of each macroblock is obtained by dividing a sum of squared differences in brightness between the two images with respect to all the pixels in a corresponding macroblock by a variance of differences in brightness between the two images with respect to pixels in stationary macroblocks. The validation statistic is expressed as the following formula 1.

$$\overline{\Delta}_i^2 = \sum_{k \in M_1} (d(k)/\sigma)^2 \qquad \text{[Formula 1]}$$

wherein d(k) indicates a difference in brightness between two pixels co-located at a position k in the two images and σ indicates a variance of differences in brightness of the stationary macroblocks.

To determine σ at this time, the stationary macroblocks should be first identified. For this, one of the following two methods can be used.

First, assuming that moving objects are in the center of a frame, macroblocks in the first line and macroblocks in the first and last columns are considered stationary and σ can be calculated from these macroblocks.

Second, assuming that stationary macroblocks has relatively smaller differences in brightness compared with changing macroblocks and objects take below 80% in an entire image, σ is calculated from the remaining 20% macroblocks having the least differences in brightness in the entire image.

Once obtaining the validation statistics of respective macroblocks through the above operations, the respective validation statistics are compared with a predetermined threshold to identify stationary macroblocks and changing macroblocks. A change detection mask is generated depending upon the identified result (30).

Specifically, if the validation statistic of a macroblock exceeds the predetermined threshold, the corresponding macroblock is identified as the changing macroblock, and if not, the corresponding macroblock is identified as the stationary macroblock.

At this time, the threshold is determined depending on a validation error and the number of pixels within a macroblock.

Thereafter, a region of each macroblock is determined based upon the information on change of the corresponding macroblock, the change detection mask of the preceding image, the current image, and a background mosaic (40).

Figure 2:
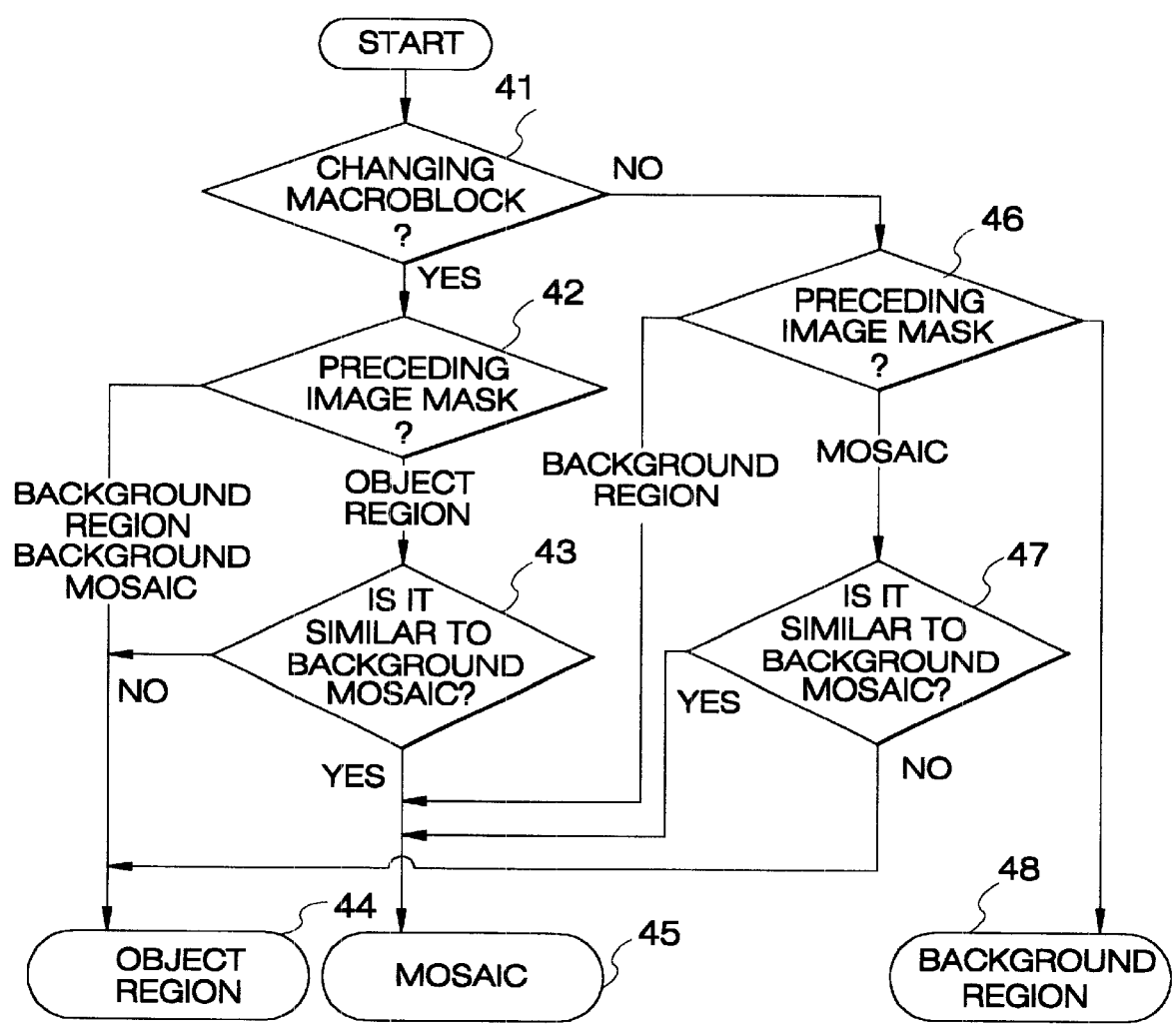
FIG. 2 is a detailed flow chart of the step of determining regions according to an embodiment of the present invention.

FIG. 2 is a detailed flow chart of the region determining step that is the last step of the segmentation method. During this step, a region where each macroblock belongs is identified, and reconstruction of the background mosaic is carried out according to the identified result.

Primarily, it is determined whether a current macroblock is identified as the changing macroblock or stationary macroblock, using the change detection mask (41).

If it is determined that the macroblock is the changing macroblock, it is determined whether a macroblock located at the same position as the current macroblock in the preceding image is identified as the object region, the background region, or the background mosaic, using a change detection mask of the preceding image (42).

If it is determined that the macroblock in the preceding image is identified as the object region, it is determined whether or not the macroblock in the current image is similar to a macroblock at the same position in the background mosaic (43).

At this time, sums of d(k) of the two macroblocks in the current image and the background mosaic are calculated. If a difference of the sums is smaller than an average of sums of d(k) of macroblock pairs identified as the stationary macroblocks in the current image and the background mosaic, the current macroblock is determined similar to the background mosaic.

At the step of determining the changing and stationary macroblocks, if the current macroblock is determined to be the stationary macroblock, it is determined whether the macroblock located at the same position in the preceding image is identified as the object region, the background region, or the background mosaic, using the change detection mask of the preceding image (46).

If the macroblock in the preceding image is determined to be the mosaic, it is determined whether or not the macroblock in the current image is similar to a macroblock at the same position in the background mosaic (47).

If the macroblock at the same position in the preceding image is determined to be the object region, the corresponding current macroblock is determined to be the object region (44).

If the macroblock at the same position in the preceding image is determined to be the mosaic, the corresponding current macroblock is determined to be the background region and, instead of the current macroblock, the background macroblock located at the same position as the current macroblock is output as a macroblock belonging to the background region (45).

Finally, if the macroblock at the same position in the preceding image is determined to be the background region, the corresponding current macroblock is determined to be the background region and the macroblock at the same position in the background mosaic is replaced by the current macroblock (48).

Accordingly, the present invention allows the object-based video coding method using segmentation to be applied to a system, such as a videophone, requiring low complexity, thereby maximizing coding efficiency. In addition, the present invention generates simple shape information in units of macroblock, thus minimizing the amount of bits required for the shape information. This makes it possible to apply the object-based video coding method to a system requiring a very low transmission rate.

It will be apparent to those skilled in the art that various modifications and variations can be made in the macroblock-based segmentation and background mosaicking method of the present invention without deviating from the spirit or scope of the invention. Thus, it is intended that the present invention covers the modifications and variations of this invention provided they come within the scope of the appended claims and their equivalents.

What is claimed is:

1. In a method of segmenting an image into several regions for object-based video coding, a macroblock-based segmentation and background mosaicking method comprising the steps of:

(a) receiving consecutive two frames;

(b) calculating validation statistics from the received frames to detect change/changelessness of respective macroblocks in a current frame;

(c) determining change/changelessness of respective macroblocks using the calculated validation statistics and generating a change detection mask; and (d) judging respective macroblocks as background regions or object regions, using the change detection mask of said current frame, a change detection mask of a preceding frame, said current frame, and a background mosaic.

2. The method as claimed in claim 1, wherein each validation statistic at said step (b) is obtained by dividing a sum of squared errors in brightness between said two frames with respect to all pixels in a corresponding macroblock by a variance of differences in brightness of stationary macroblocks.

3. The method as claimed in claim 2, wherein said stationary macroblocks are defined by macroblocks in a first line and in first and last columns in the frame or by macroblocks having least differences in brightness in the entire current frame.

4. The method as claimed in claim 1, wherein said change detection mask at said step (c) is generated by comparing the validation statistics of respective macroblocks with a specified threshold previously determined according to a validation error and the number of pixels in each macroblock.

5. The method as claimed in claim 1, wherein said step (d) of determining regions comprises the steps of:

(a') determining whether or not a current macroblock identified as a changing macroblock, using the change detection masks of said current and preceding frames, said current frame, and said background mosaic;

(b') after finishing the step (a'), determining as what region a macroblock in said preceding frame is identified, said macroblock in said preceding frame being located at the same position as said current macroblock; and (c') determining whether or not said current macroblock is similar to a macroblock at the same position as said current macroblock in the background mosaic through comparison.

6. The method as claimed in claim 5, wherein said comparison at said step (c') is carried out based upon a sum of differences between respective pixel values in said current macroblock and respective corresponding pixel values in said macroblock in said background mosaic and an average of sums of differences between respective pixel values in macroblocks determined as the stationary macroblocks and respective corresponding pixel values in the corresponding macroblocks in said background mosaic.

* * * * *